United States Patent
Lee et al.

(10) Patent No.: US 10,391,967 B2
(45) Date of Patent: Aug. 27, 2019

(54) ROOF AIRBAG APPARATUS

(71) Applicant: HYUNDAI MOBIS CO., LTD., Seoul (KR)

(72) Inventors: Seok Min Lee, Yongin-si (KR); Hae Kwon Park, Yongin-si (KR); Kyu Sang Lee, Yongin-si (KR); Byung Ho Min, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 72 days.

(21) Appl. No.: 15/799,671

(22) Filed: Oct. 31, 2017

(65) Prior Publication Data

US 2018/0162313 A1 Jun. 14, 2018

(30) Foreign Application Priority Data

Dec. 12, 2016 (KR) .................. 10-2016-0168989

(51) Int. Cl.
| | |
|---|---|
| *B60R 21/213* | (2011.01) |
| *B60R 21/214* | (2011.01) |
| *B60R 21/231* | (2011.01) |
| *B60R 21/2338* | (2011.01) |
| *B60R 21/233* | (2006.01) |
| *B60R 21/16* | (2006.01) |

(52) U.S. Cl.
CPC .......... *B60R 21/233* (2013.01); *B60R 21/213* (2013.01); *B60R 21/214* (2013.01); *B60R 21/231* (2013.01); *B60R 21/2338* (2013.01); *B60R 2021/161* (2013.01); *B60R 2021/23192* (2013.01); *B60R 2021/23316* (2013.01); *B60R 2021/23386* (2013.01)

(58) Field of Classification Search
CPC ... B60R 21/213; B60R 21/214; B60R 21/231; B60R 21/232; B60R 21/233; B60R 21/2338; B60R 2021/23192; B60R 2021/23316; B60R 2021/23386; B60R 2021/161; B60R 2021/0018; B60R 2021/23382; B60R 2021/138
USPC ............ 280/729, 730.2, 743.2, 728.2, 730.1, 280/743.1
See application file for complete search history.

(56) References Cited

U.S. PATENT DOCUMENTS

| | | | | |
|---|---|---|---|---|
| 6,520,572 | B1 * | 2/2003 | Niederman | ................ B60J 7/06 180/281 |
| 2002/0014762 | A1 * | 2/2002 | Bakhsh | ................ B60R 21/232 280/730.2 |
| 2005/0134027 | A1 * | 6/2005 | Noguchi | ................ B60R 21/213 280/730.2 |

* cited by examiner

*Primary Examiner* — Keith J Frisby
(74) *Attorney, Agent, or Firm* — Knobbe Martens Olson & Bear LLP

(57) ABSTRACT

A roof airbag apparatus may include: a gas injector configured to inject gas; a tether guide disposed along the longitudinal direction of a roof; a chamber part connected to the tether guide, and deployed by gas received from the gas injector; and a chamber moving part installed in the chamber part, and moving the chamber part while being pressed by the gas transferred to the chamber part.

8 Claims, 5 Drawing Sheets

ROOF AIRBAG APPARATUS

CROSS-REFERENCES TO RELATED APPLICATIONS

The present application claims priority to Korean application number 10-2016-0168989, filed on Dec. 12, 2016, which is incorporated by reference in its entirety.

BACKGROUND OF THE INVENTION

The present invention relates to a roof airbag apparatus, and more particularly, to a roof airbag apparatus capable of preventing an injury or separation of a passenger when a vehicle accident occurs.

In general, a vehicle includes an airbag apparatus installed to protect a passenger. The airbag apparatus may be installed at the front, both sides and top of the vehicle depending on the spec of the vehicle.

A conventional airbag apparatus includes a gas injector and a chamber part. When a predetermined magnitude or more of external shock is applied to a vehicle, the gas injector generates gas and injects the generated gas into the chamber part to deploy the chamber part, thereby protecting the body of a passenger.

The conventional airbag apparatus has a problem in that an upper chamber part of the vehicle has not completely covered a panorama sunroof or the like and the deployed chamber part could not stably support a passenger when the chamber part is moved or separated. Furthermore, when the chamber part is expanded, the frictional force between guide tabs and a tether guide may be increased to lower the deployment speed, and the guide tabs may be damaged. Therefore, there is a demand for an apparatus capable of solving the problem.

The related art is disclosed in Japanese Patent Publication No. 2015-020509 published on Feb. 2, 2015 and entitled "Center airbag apparatus for vehicle and passenger protection device".

SUMMARY OF THE INVENTION

Embodiments of the present invention are directed to a roof airbag apparatus capable of preventing an injury or separation of a passenger, which may be caused by a damage of a panorama sunroof or the like, when a vehicle accident occurs.

In one embodiment, a roof airbag apparatus may include: a gas injector configured to inject gas; a tether guide disposed along the longitudinal direction of a roof; a chamber part connected to the tether guide, and deployed by gas received from the gas injector; and a chamber moving part installed in the chamber part, and moving the chamber part while being pressed by the gas transferred to the chamber part.

The tether guide may include a pair of tether guides disposed at both sides of the roof to support both sides of the chamber part.

The chamber part may include: a first chamber connected to the tether guide, and deployed by the gas received from the gas injector; and a second chamber connected to the first chamber, and deployed by the gas received from the first chamber.

The first chamber may include a pair of first chambers connected to the pair of tether guides, respectively, and the second chamber is located between the first chambers.

The first chamber may include: a first chamber introduction part to which gas discharged from the gas injector is introduced; a first deployment part having one end communicating with the first chamber introduction part, connected to the tether guide, and deployed along the longitudinal direction of the tether guide; a side discharge part communicating with the other end of the first deployment part and the second chamber, and transferring the gas received from the first deployment part to the second chamber; and a guide tab connected to one side of the first deployment part, and having the tether guide movably inserted therein.

The guide tab may include a plurality of guide tabs arranged in the longitudinal direction of the first deployment part.

The first deployment part may include: a first deployment surface to which the guide tab is coupled; and a second deployment surface surrounding the second chamber. The chamber moving part may be formed on the first or second deployment surface.

The chamber moving part may include: a chamber moving body part housed in the first deployment part, and located at a position separated from the first deployment part when the first deployment part is deployed; and a chamber moving coupling part connected to the chamber moving body part, and coupled to the first deployment part.

The chamber moving part may include a first moving protrusion that protrudes from the first deployment surface toward the second deployment surface, and moves the first deployment part when being pressed by the gas introduced into the first deployment part.

The chamber moving part may include a second moving protrusion that protrudes from the second deployment surface toward the first deployment surface, and moves the first deployment part when being pressed by the gas introduced into the first deployment part.

The first moving protrusion may include a plurality of first moving protrusions, the second moving protrusion may include a plurality of second moving protrusions, and the plurality of first moving protrusions and the plurality of second moving protrusions are arranged in the longitudinal direction of the first deployment part.

The first moving protrusion may include a plurality of first moving protrusions, the second moving protrusion may include a plurality of second moving protrusions, and the plurality of first moving protrusions and the plurality of second moving protrusions are alternately arranged in the longitudinal direction of the first deployment part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
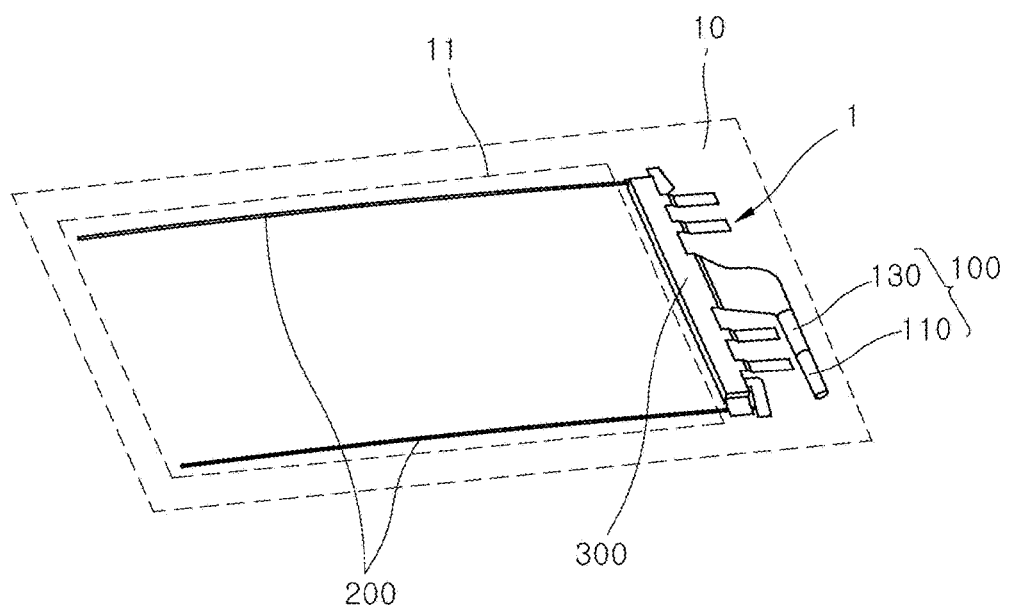
FIG. 1 is a perspective view illustrating that a chamber part of a roof airbag apparatus in accordance with an embodiment of the present invention is folded and installed in a vehicle.
Figure 2:
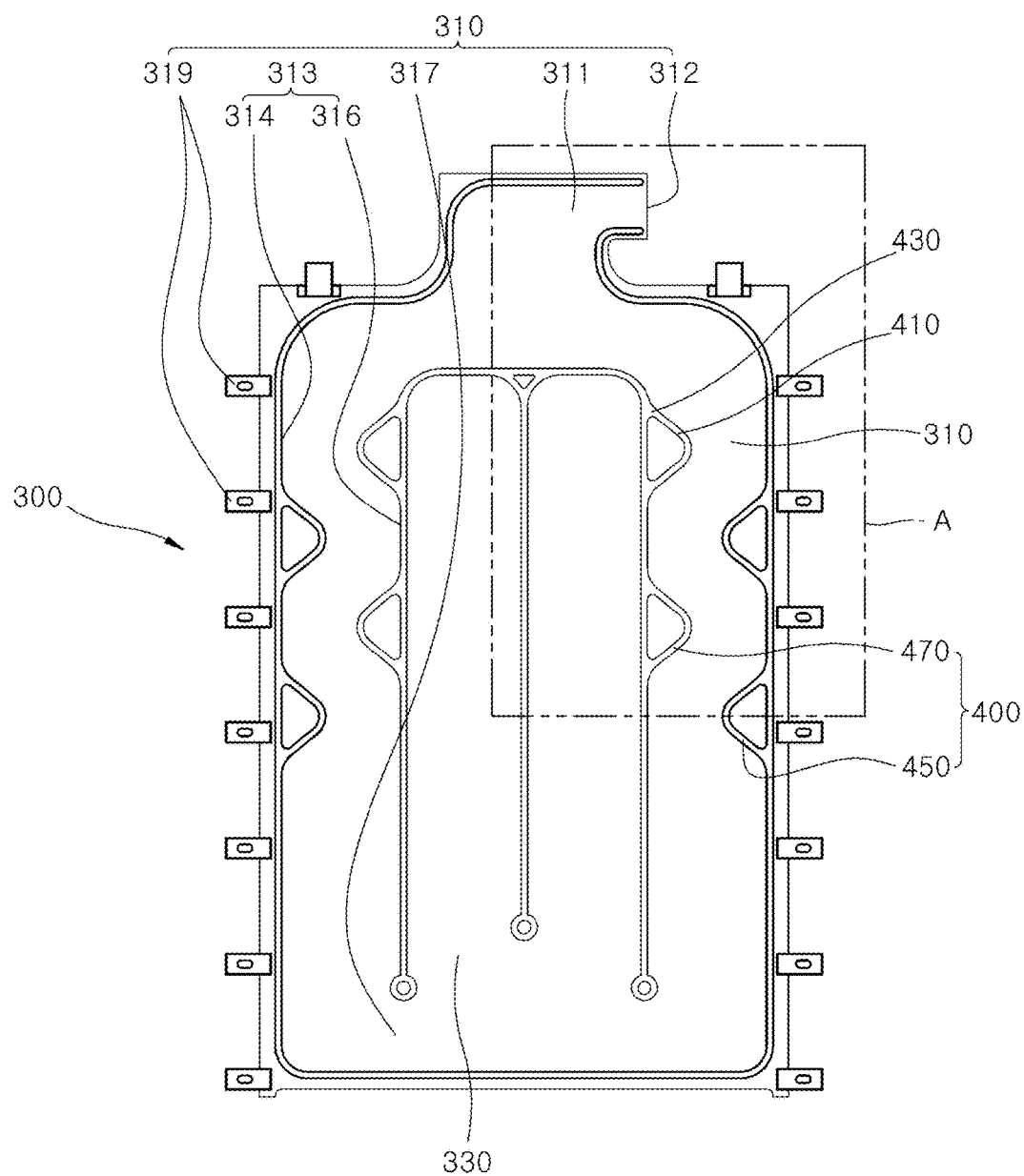
FIG. 2 is a plan view of the roof airbag apparatus in accordance with the embodiment of the present invention.
Figure 3:
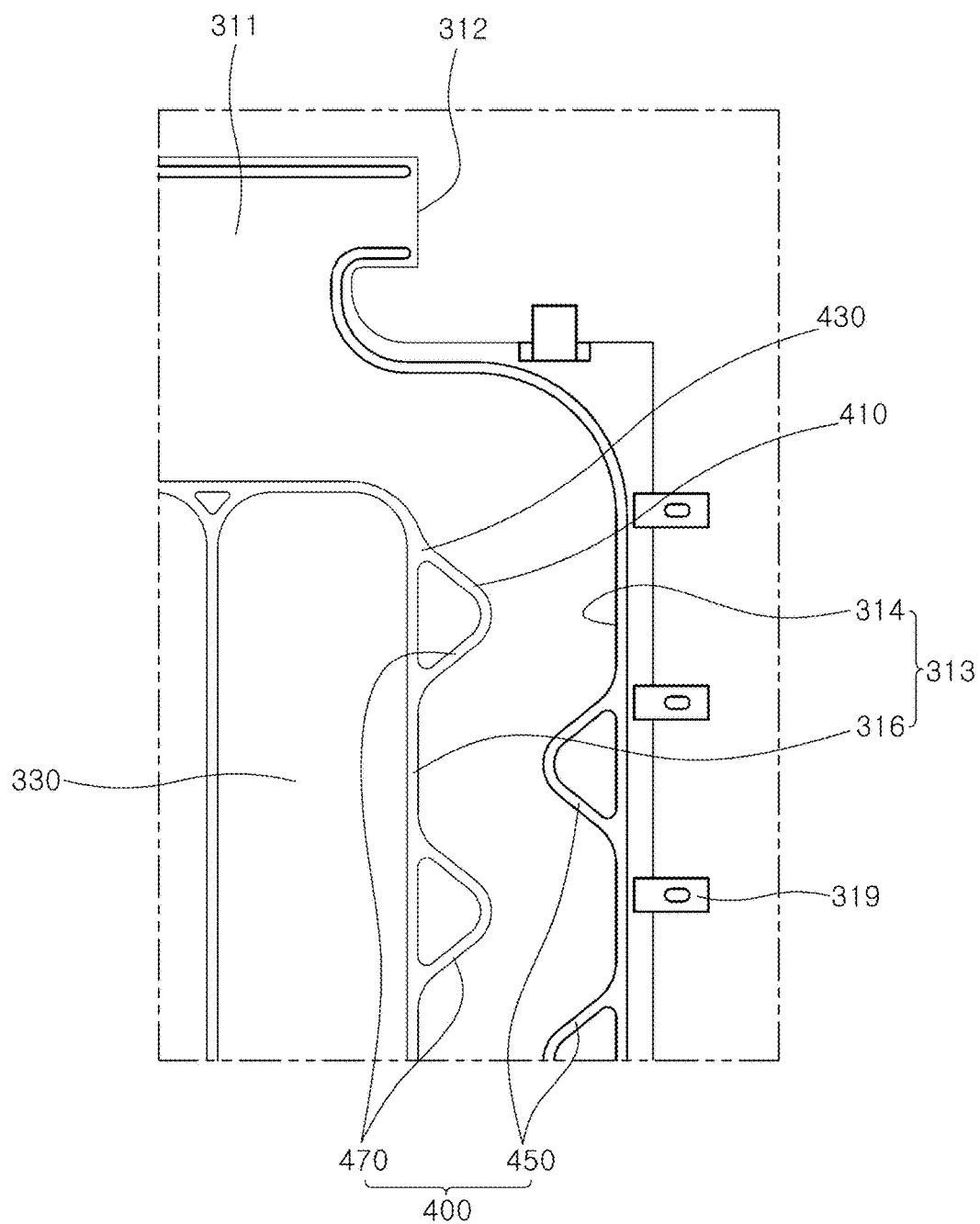
FIG. 3 illustrates a portion A of FIG. 2.

FIG. 1 is a perspective view illustrating that a chamber part of a roof airbag apparatus in accordance with an embodiment of the present invention is folded and installed in a vehicle, FIG. 2 is a plan view of the roof airbag apparatus in accordance with the embodiment of the present invention, and FIG. 3 illustrates a portion A of FIG. 2.

Referring to FIGS. 1 to 3, the roof airbag apparatus 1 in accordance with the present embodiment may include a gas injector 100, a tether guide 200, a chamber part 300 and a chamber moving part 400.

The gas injector 100 may be installed at the top of the vehicle. For example, the gas injector 100 in a panorama sunroof 11 mounted in a vehicle roof 10 or at one side of the panorama sunroof 11. The gas injector 100 may inject gas into the chamber part 300 to deploy the chamber part 300, in case of an emergency such as a collision or overturn of the vehicle. In the present embodiment, the gas injector 100 may include an inflator 110 and a gas guide 130.

The inflator 110 may generate gas. In the present embodiment, the inflator 110 may be installed at the top of the vehicle, for example, in the roof 10 of the vehicle through bolting or welding.

In the present embodiment, the inflator 110 may include an ignition device (not illustrated). The inflator 110 may generate gas through the ignition device that ignites powder according to a sensing signal of a collision sensor (not illustrated), and inject the generated gas into the chamber part 300.

The gas guide 130 may guide the gas received from the inflator 110 into a first chamber 310. In the present embodiment, the gas guide 130 may be made of a metallic material, and formed in a pipe shape to connect the inflator 110 and the first chamber 310.

The tether guide 200 may be disposed along the longitudinal direction of the panorama sunroof 11 (top-to-bottom direction of FIG. 2). In the present embodiment, a pair of tether guides 200 may be installed in parallel to each other while being separated from each other in the widthwise direction of the roof 10 (side-to-side direction of FIG. 2), and arranged at both sides of the roof 10 so as to support both sides of the chamber part 300.

Since the tether guides 200 are disposed at both sides of the panorama-type sunroof 11 and support both sides of the chamber part 300, the tether guides 200 can stably support both sides of the chamber part 300 when the chamber part 300 is expanded, thereby preventing an injury or separation of a passenger.

The chamber part 300 may be connected to the tether guide 200, expanded by the gas received from the gas injector 100, and cover the roof 10 of the vehicle. In the present embodiment, the chamber part 300 may include first and second chambers 310 and 330.

The first chamber 310 may be connected to the tether guide 200, and deployed along the longitudinal direction of the tether guide 200 by the gas received from the gas injector 100. In the present embodiment, the first chamber 310 may include a first chamber introduction part 311, a first deployment part 313, a side discharge part 317 and a guide tab 319.

The first chamber introduction part 311 may be connected to the gas injector 100, and receive gas discharged from the gas injector 100. In the present embodiment, the first chamber introduction part 311 may have an open introduction port 312 into which the gas injector 100 is inserted, or communicates with the chamber part 300 so as to receive the gas injected from the gas injector 100.

The first chamber introduction part 311 may be integrated with another first chamber introduction part 311 adjacent thereto, receive gas generated by one gas injector 100, and transfer the received gas to the first deployment parts 313 connected to the respective first chamber introduction parts 311.

In other words, when the pair of chamber parts 300 is installed, the pair of first chamber introduction parts 311 may also be installed so as to be separated from each other. However, one first chamber introduction part 311 connected to the respective first deployment parts 313 may be connected to one gas injector 100, and transfer gas received from the gas injector 100 to the first deployment parts 313.

The first deployment part 313 may have one end communicating with the first chamber introduction part 311 and one side connected to the tether guide 200 through the guide tab 319. Thus, the first deployment part 313 may be deployed in the longitudinal direction of the tether guide 200.

In the present embodiment, the first deployment part 313 may include a first deployment surface 314 having the guide tab 319 coupled thereto and a second deployment surface 316 surrounding the second chamber 330, and the chamber moving part 400 may be formed on the first or second deployment surface 314 or 316.

The side discharge part 317 may communicate with the other end of the first deployment part 313 and the second chamber 330, and transfer the gas received from the first deployment part 313 to the second chamber 330.

The guide tab 319 may be connected to one side of the first deployment part 313, and the tether guide 200 may be movably inserted into the guide tab 319 such that the guide tab 319 can be moved in the longitudinal direction of the tether guide 200. In the present embodiment, the first chamber 310 may include a plurality of guide tabs 319 arranged in the longitudinal direction of the first deployment part 313.

In the present embodiment, the guide tab 319 may have a hole formed in substantially the center thereof such that the tether guide 200 is inserted into the hole, or have both ends coupled to the first deployment part 313 while surrounding the tether guide 200 (folding type).

The second chamber 330 may be connected to the first chamber 310 and deployed by the gas received from the first chamber 310. In the present embodiment, the second chamber 330 may receive gas from the side discharge part 317 located at one end of the first chamber 310, the gas being moved from the one end to the other end of the first chamber 310.

Therefore, the chamber part 300 may be implemented in such a manner that the deployment of the second chamber 330 is started after the deployment of the first chamber 310 is started in the longitudinal direction of the tether guide 200.

Thus, the deployment of the first chamber 310 can be preferentially performed, compared to when the first and second chambers 310 and 330 are deployed at the same time, which makes it possible to secure the deployment speed in the longitudinal direction of the tether guide 200.

In the present embodiment, the pair of first chambers 310 may be installed and connected to the pair of tether guides 200, respectively, and the second chamber 330 may be located between the first chambers 310. Thus, after side expansion of the chamber part 300 is started by the deployment of the first chamber 310 in the longitudinal direction, the widthwise central portion of the chamber part 300 may be expanded.

Figure 4:
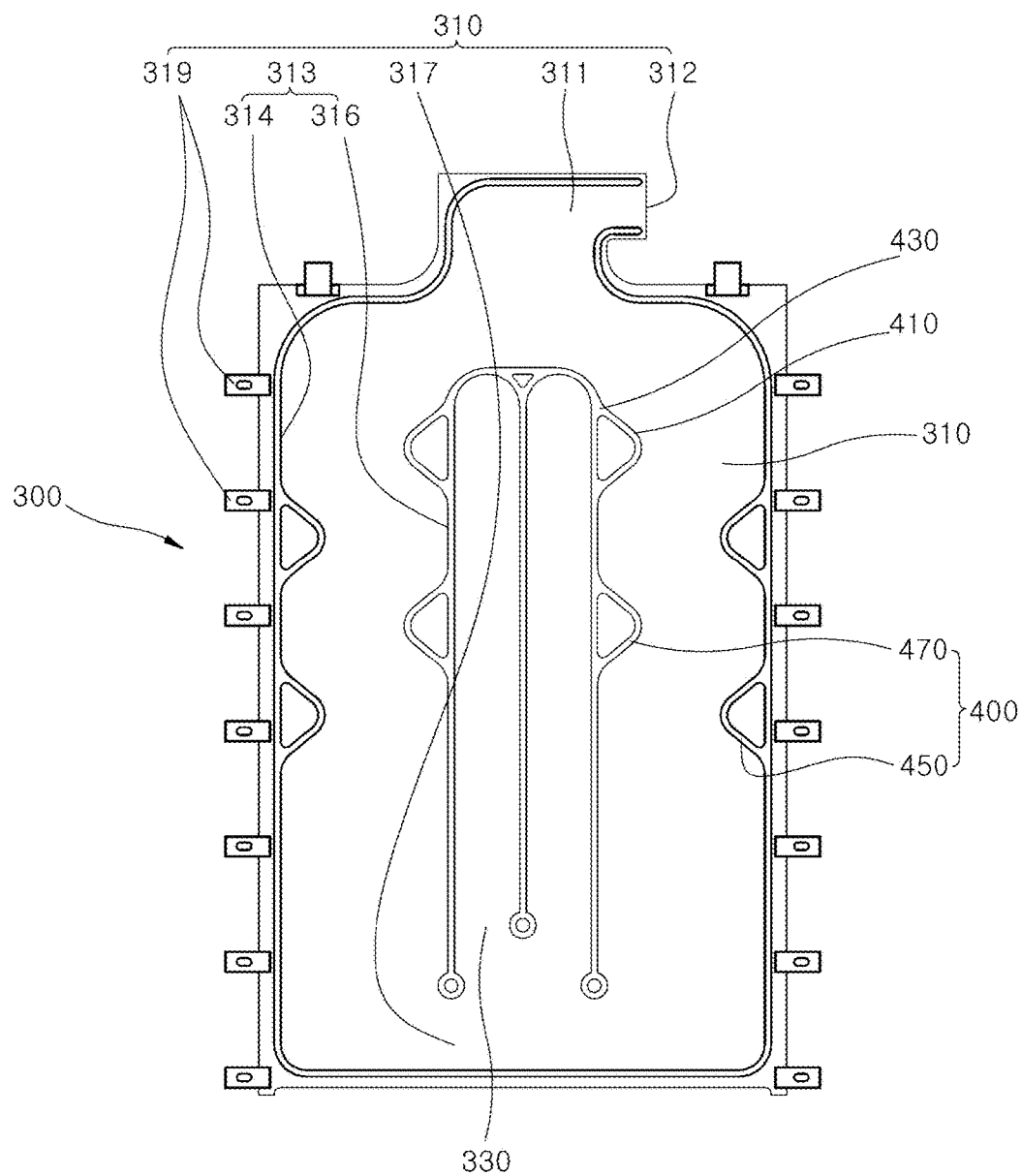
FIG. 4 illustrates that the widths of first and second chambers are adjusted in the roof airbag apparatus in accordance with the embodiment of the present invention.

FIG. 4 illustrates that the widths of the first and second chambers are adjusted in the roof airbag apparatus in accordance with the embodiment of the present invention. Referring to FIGS. 2 and 4, the widths of the first and second chambers 310 and 330 may be adjusted suitably for the mounting state of the chamber part 300, in consideration of the length and width of the chamber part 300 and the injection pressure of the gas.

When the width of the first chamber 310 is relatively reduced, the deployment time of the first chamber 310 can be shortened, and gas can be rapidly transferred to the second chamber 330, which makes it possible to advance the expansion start time of the second chamber 330.

Furthermore, when the width of the first chamber 310 is relatively increased, resistance caused by gas introduced into the first chamber 310 can be reduced, which makes it possible to not only increase the introduction speed of the gas, but also reduce a damage of the chamber part 300.

The widths and lengths of the first and second chambers 310 and 330 may be changed depending on the size of the vehicle in which the chamber part 300 is mounted or specifically the shapes of the roof 10 and the sunroof 11.

The chamber moving part 400 may be installed in the chamber part 300, and move the chamber part 300 while being pressed by the gas transferred to the chamber 300. Thus, the chamber moving part 400 can reduce friction between the guide tab 319 and the tether guide 200, and prevent the guide tab 319 from being locked to the tether guide 200.

In the present embodiment, the chamber moving part 400 may include a chamber moving body part 410 and a chamber moving coupling part 430. The chamber moving body part 410 may be housed in the first deployment part 313, and separated from the first deployment part 313 so as to be convex toward the inside of the first deployment part 313 when the first deployment part 313 is deployed, and the chamber moving coupling part 430 may be connected to the chamber moving body part 410, and coupled to the first deployment part 313 through sewing or integrated with the first deployment part 313. The chamber moving part 400 may switch the transfer path of the gas introduced into the first deployment part 313, and move the guide tabs 319 with the first deployment part 313.

In the present embodiment, the chamber moving part 400 may include a first moving protrusion 450. The first moving protrusion 450 may protrude toward the second deployment surface 316 from the first deployment surface 314. When the first moving protrusion 450 is pressed by gas introduced into the first deployment part 313, the first moving protrusion 450 may be moved with the first deployment surface 314, and move the first deployment part 313.

Furthermore, since the path of the gas introduced into the first deployment part 313 is switched by the first moving protrusion 450, the first deployment part 313 may be moved by a reaction force generated during the path switching of the gas, a flow of the gas, and an occurrence of pressure difference.

In the present embodiment, the chamber moving part 400 may further include a second moving protrusion 470. The second moving protrusion 470 may protrude toward the first deployment surface 314 from the second deployment surface 316. When the second moving protrusion 470 is pressed by gas introduced into the first deployment part 313, the second moving protrusion 470 may be moved with the second deployment surface 314, and move the first deployment part 313.

Furthermore, since the path of the gas introduced into the first deployment part 313 is switched by the second moving protrusion 470, the first deployment part 313 may be moved by a reaction force generated during the path switching of the gas, a flow of the gas, and an occurrence of pressure difference.

Since the first deployment part 313 is moved by the movements of the first and second moving protrusions 450 and 470, the gas flow and the occurrence of pressure difference, the guide tab 319 coupled to the first deployment part 313 may be moved along the tether guide 200, thereby reducing the friction between the guide tab 319 and the tether guide 200, and preventing the guide tab 319 from being locked to the tether guide 200.

Figure 5:
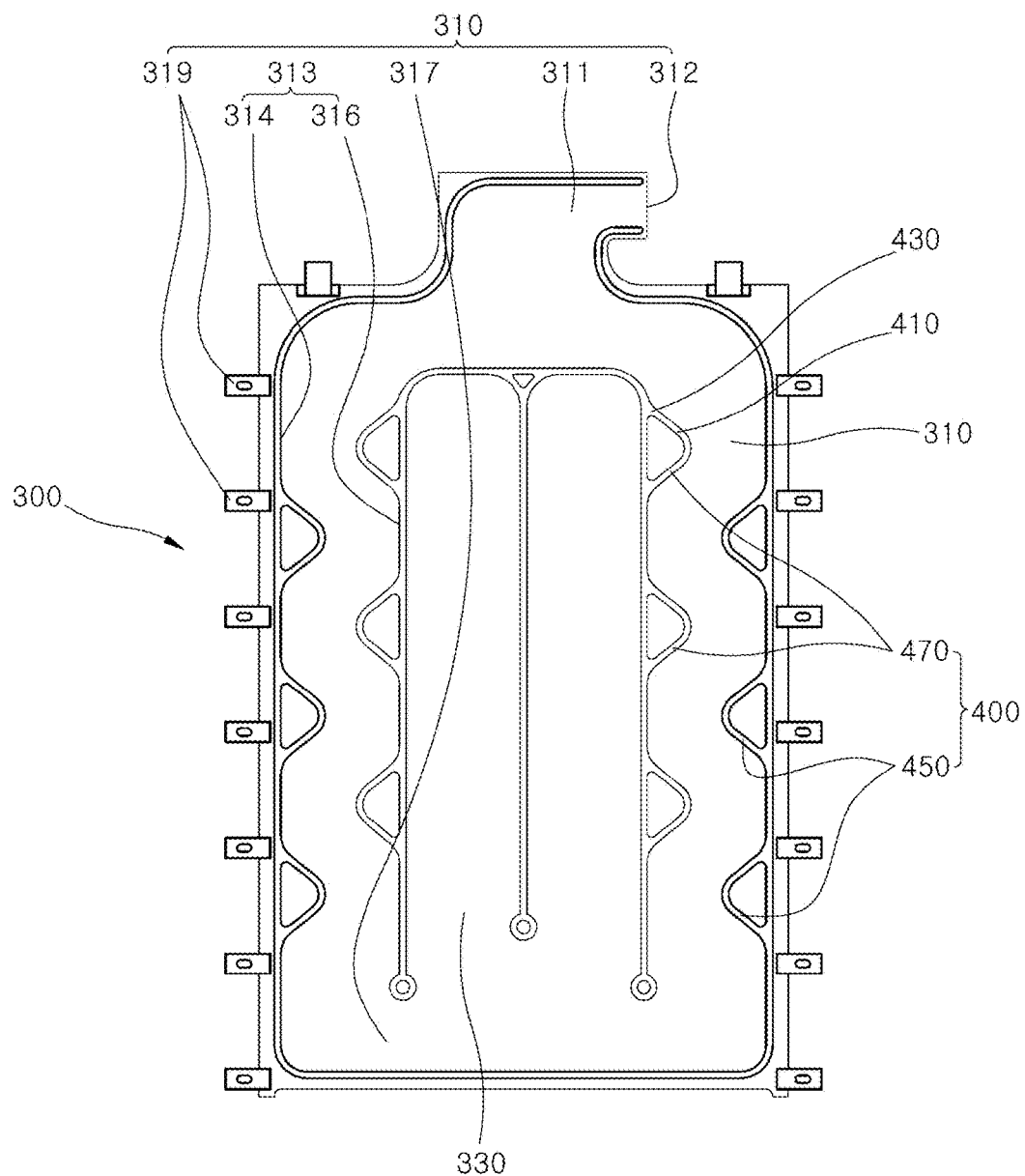
FIG. 5 illustrates that the chamber moving part is disposed in the longitudinal direction of the first deployment part in the roof airbag apparatus in accordance with the embodiment of the present invention.

FIG. 5 illustrates that the chamber moving part is disposed in the longitudinal direction of the first deployment part in the roof airbag apparatus in accordance with the embodiment of the present invention.

Referring to FIGS. 2 and 5, the plurality of first and second moving protrusions 450 and 470 may be arranged in the longitudinal direction of the first deployment part 313, and move the guide tabs 319 using the structure in which the first deployment part 313 is moved across the elongated region along the longitudinal direction.

Furthermore, the first and second moving protrusions 450 and 470 may be alternately arranged in the longitudinal direction of the first deployment part 313, such that gas passing through the first deployment part 313 can move the first deployment part 313 while being transferred in a zigzag manner.

The chamber part 300 having the chamber moving part 400 mounted therein may have a structure in which both sides thereof are formed symmetrically with respect to the widthwise center of the chamber part 300. Thus, when the chamber part 300 is deployed, a difference in deployment speed between both sides of the chamber part 300 may fall within a preset difference value, which makes it possible to improve the deployment performance and the passenger protection performance after deployment.

Hereafter, the operation principle and effect of the roof airbag apparatus 1 in accordance with the embodiment of the present invention will be described as follows.

In case of an emergency such as a collision or overturn of the vehicle, the gas injector 100 may generate and inject gas according to a signal generated by the collision sensor. The gas generated by the gas injector 100 may be introduced into the first chamber introduction part 311 and transferred to the first deployment part 313.

The gas introduced into the first deployment part 313 may expand the first deployment part 313 while being transferred toward the side discharge part 317 from the first chamber introduction part 311. The process of expanding the first deployment part 313, the path of the gas may be switched while the gas press the first and second moving protrusions 450 and 470, and the gas may be transferred to the side discharge part 317.

During the deployment process of the first deployment part 313, the first deployment part 313 may be moved by the pressure difference generated by the path switching of the gas passing through the first deployment part 313, the force of the gas pressing the first and second deployment surfaces 314 and 316, and the first and second moving protrusions 450 and 470 which are pressed and moved by the gas.

Since the movement of the first deployment part 313 moves the guide-tabs 319 coupled to the first deployment part 313, it is possible to not only decrease the friction between the guide tabs 319 and the tether guide 200, but also prevent the guide tabs 319 from being locked to the tether guide 200.

Furthermore, a difference between the speed at which the guide tabs 319 are deployed through the tether guide 200 and the speed at which the gas is introduced into the first deployment part 313 to deploy the first deployment part 313 can be reduced to decrease the friction between the guide tabs 319 and the tether guide 200 at the initial stage of the deployment of the chamber part 300.

The gas transferred to the side discharge part 317 through the first deployment part 313 may be transferred to the second chamber 330 to deploy the second chamber 330. Since the gas introduced into the first chamber 310 starts to deploy the first chamber 310 and is then transferred to the second chamber 330, the speed at which the chamber part 300 is deployed in the longitudinal direction of the tether guide 200 can be increased, and the side surface of the second chamber 330 can be stably supported.

In accordance with the present embodiment, since the chamber part 300 shields the whole panorama sunroof 11 while being expanded by the gas, the roof airbag apparatus 1 can prevent an injury of a passenger, which may be caused by a damage of the panorama sunroof 11.

Furthermore, since both sides of the chamber part 300 is supported by the tether guide 200, the roof airbag apparatus 1 can stably support the chamber part 300 even after deployment, thereby prevent a separation of the passenger.

Furthermore, since the roof airbag apparatus 1 deploys the chamber part 300 by preferentially transferring the gas injected from the gas injector 100 to the first chamber 310 located at the side and then transferring the gas to the second chamber 330 located in the center, the expansion performance of the first chamber 310 in the longitudinal direction can be secured.

Furthermore, since the roof airbag apparatus 1 includes the chamber moving part 400, the roof airbag apparatus 1 may switch the transfer path of the gas when the first deployment part 313 is deployed, and the guide tabs 319 connected to the first deployment part 313 may be moved by the gas. Thus, the roof airbag apparatus 1 can reduce the friction between the guide tab 319 and the tether guide 200, raise the deployment speed of the chamber part 300, and decrease the deployment speed difference of both sides of the chamber part 300.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A roof airbag apparatus for a vehicle, comprising:
a gas injector configured to inject gas;
a tether guide disposed along a longitudinal direction of a roof of the vehicle;
a chamber part connected to the tether guide, and configured to deploy by gas from the gas injector; and
a chamber moving part installed in the chamber part, and configured to move the chamber part when pressed by the gas, wherein the chamber part comprises:
a first chamber connected to the tether guide, and configured to deploy by the gas, and
a second chamber connected to the first chamber, wherein the second chamber is configured to receive the gas via the first chamber and deploy by the gas,
wherein the first chamber comprises:
a first chamber introduction part configured to receive the gas from the gas injector;
a first deployment part having one end in fluid communication with the first chamber introduction part to receive the gas from the first chamber introduction part, wherein the first deployment part is connected to the tether guide and configured to deploy along a longitudinal direction of the tether guide;
a side discharge part in fluid communication with the other end of the first deployment part and the second chamber, wherein the side discharge part is configured to receive the gas from the first deployment part and transfer the gas to the second chamber; and
a guide tab connected to one side of the first deployment part, and having the tether guide movably inserted therein.

2. The roof airbag apparatus of claim 1, wherein the guide tab comprises a plurality of guide tabs arranged in the longitudinal direction of the first deployment part.

3. The roof airbag apparatus of claim 1, wherein the first deployment part comprises:
a first deployment surface to which the guide tab is coupled; and
a second deployment surface surrounding the second chamber,
wherein the chamber moving part is formed on the first or second deployment surface.

4. The roof airbag apparatus of claim 3, wherein the chamber moving part comprises:
a chamber moving body part housed in the first deployment part, and located at a position separated from the first deployment part when the first deployment part is deployed; and
a chamber moving coupling part connected to the chamber moving body part, and coupled to the first deployment part.

5. The roof airbag apparatus of claim 3, wherein the chamber moving part comprises a first moving protrusion that protrudes from the first deployment surface toward the second deployment surface, and moves the first deployment part when being pressed by the gas introduced into the first deployment part.

6. The roof airbag apparatus of claim 5, wherein the chamber moving part comprises a second moving protrusion that protrudes from the second deployment surface toward the first deployment surface, and moves the first deployment part when being pressed by the gas introduced into the first deployment part.

7. The roof airbag apparatus of claim 6, wherein the first moving protrusion comprises a plurality of first moving protrusions, the second moving protrusion comprises a plurality of second moving protrusions, and the plurality of first moving protrusions and the plurality of second moving protrusions are arranged in the longitudinal direction of the first deployment part.

8. The roof airbag apparatus of claim 7, wherein the plurality of first moving protrusions and the plurality of second moving protrusions are alternately arranged in the longitudinal direction of the first deployment part.

* * * * *